US012595878B2

(12) United States Patent
Na et al.

(10) Patent No.: US 12,595,878 B2
(45) Date of Patent: Apr. 7, 2026

(54) DISPLAY DEVICE

(71) Applicant: LG ELECTRONICS INC., Seoul (KR)

(72) Inventors: Seokhun Na, Seoul (KR); Kwangho Choi, Seoul (KR); Donghee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 18/845,681

(22) PCT Filed: Mar. 11, 2022

(86) PCT No.: PCT/KR2022/003438
§ 371 (c)(1),
(2) Date: Sep. 10, 2024

(87) PCT Pub. No.: WO2023/171841
PCT Pub. Date: Sep. 14, 2023

(65) Prior Publication Data
US 2025/0199591 A1    Jun. 19, 2025

(30) Foreign Application Priority Data
Mar. 10, 2022    (KR) ........................ 10-2022-0029822

(51) Int. Cl.
*F16M 13/02*        (2006.01)
*F16B 21/09*        (2006.01)
*F16M 11/10*        (2006.01)

(52) U.S. Cl.
CPC ............. *F16M 13/02* (2013.01); *F16B 21/09* (2013.01); *F16M 11/10* (2013.01)

(58) Field of Classification Search
CPC ...... F16M 11/041; F16M 13/02; F16M 11/18; F16M 11/10; G06F 1/16; F16B 21/09;
(Continued)

(56) References Cited

U.S. PATENT DOCUMENTS 7,097,143  B2 *  8/2006  Kim ................... F16M 11/2092
                                                          248/922
11,744,367  B2 *  9/2023  Sansoe ................... A47B 96/06
                                                          248/205.1
(Continued)

FOREIGN PATENT DOCUMENTS

JP        2008069937  A  *  3/2008  ............. F16M 11/60
KR    10-2007-0018402  A      2/2007
(Continued)

*Primary Examiner* — Hiwot E Tefera
(74) *Attorney, Agent, or Firm* — Birch, Stewart, Kolasch & Birch, LLP

(57)        ABSTRACT

This display device may comprise a display body and at least one fastening mechanism for fixing the display body onto a wall. The at least one fastening mechanism may include: a first fastening member which has a first threaded portion screw-fastened to the display body and from which a pair of first protrusion portions protrude; a second fastening member which has a second threaded portion screw-fastened to the wall and from which a pair of second protrusion portions protrude; and a fixer having a first connection portion, which has a first rib inserted between the pair of first protrusion portions, and a second connection portion, which has a second rib inserted between the pair of second protrusion portions.

10 Claims, 11 Drawing Sheets

(58) Field of Classification Search
CPC .......... F16B 12/34; F16B 12/22; F16B 2/065;
A47F 5/08; H04N 5/645; G02F 1/133308;
G02F 2201/46
USPC ........ 248/225.11, 917, 205.1, 231.9, 231.91;
411/401, 482
See application file for complete search history.

(56) References Cited

U.S. PATENT DOCUMENTS

| | | | | |
|---|---|---|---|---|
| 2002/0153462 | A1* | 10/2002 | Donahue | B62J 17/04 |
| | | | | 296/78.1 |
| 2007/0057133 | A1* | 3/2007 | Cottingham | F16M 13/02 |
| | | | | 248/309.1 |
| 2008/0083865 | A1* | 4/2008 | Matsui | F16M 11/10 |
| | | | | 248/496 |
| 2008/0237434 | A1* | 10/2008 | Lin | F16M 13/02 |
| | | | | 248/497 |
| 2008/0316690 | A1* | 12/2008 | Kim | H05K 5/02 |
| | | | | 361/679.27 |
| 2010/0200714 | A1* | 8/2010 | Persson | F16M 13/02 |
| | | | | 248/231.91 |
| 2013/0200233 | A1* | 8/2013 | Feddes | F16M 13/02 |
| | | | | 248/225.11 |
| 2013/0306816 | A1* | 11/2013 | Yoshida | F16M 13/02 |
| | | | | 248/224.51 |
| 2014/0166834 | A1* | 6/2014 | Kuroyanagi | F16M 13/02 |
| | | | | 248/231.91 |

FOREIGN PATENT DOCUMENTS

| | | | |
|---|---|---|---|
| KR | 20-0438463 | Y1 | 2/2008 |
| KR | 10-2014-0104836 | A | 8/2014 |
| KR | 10-2016-0141478 | A | 12/2016 |
| KR | 10-2018-0038182 | A | 4/2018 |
| KR | 10-2019-0004514 | A | 1/2019 |
| KR | 10-2158818 | B1 | 9/2020 |

* cited by examiner

Figure 2:
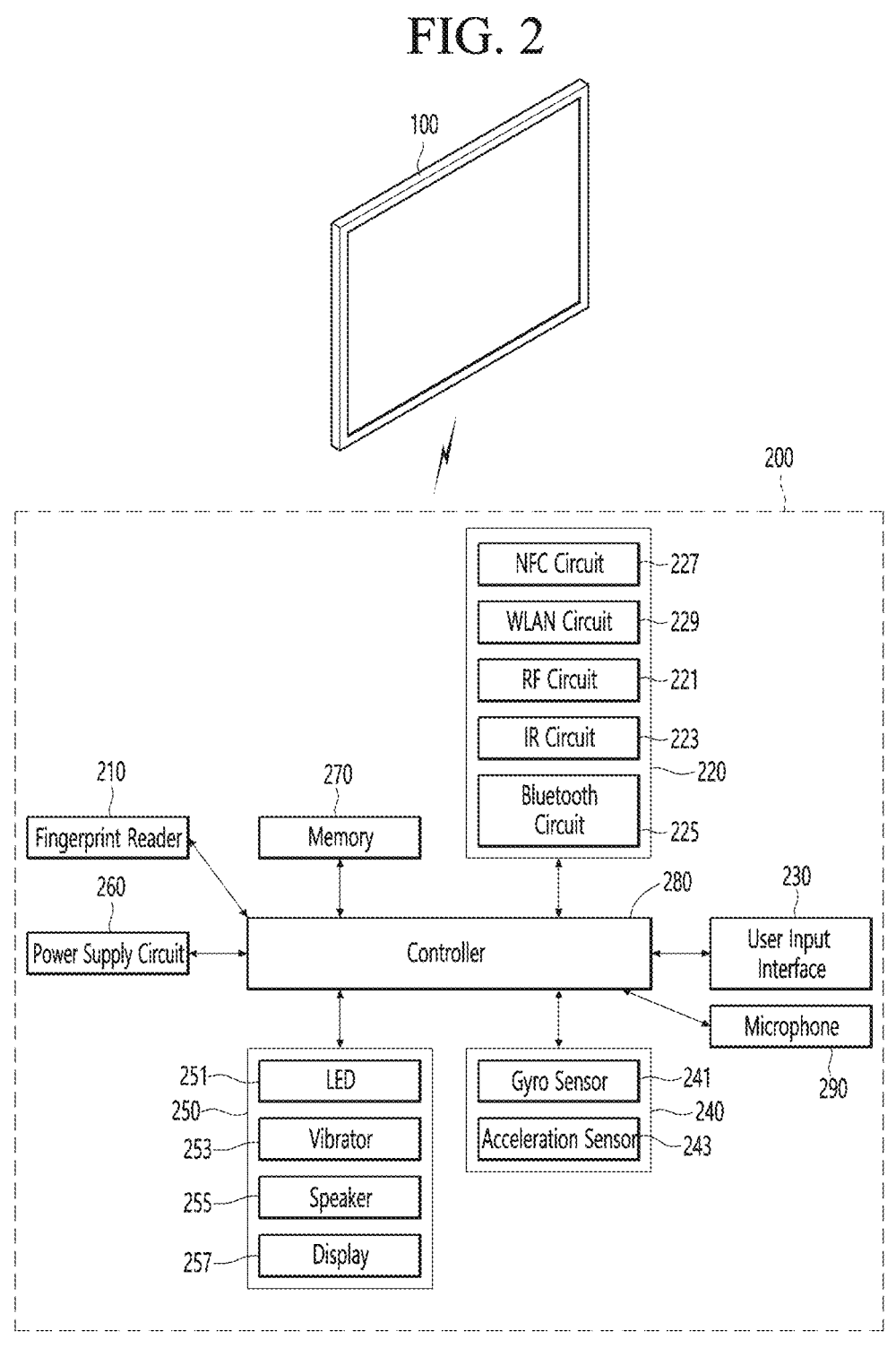

| | |
|---|---|
| NFC Circuit | ~227 |
| WLAN Circuit | ~229 |
| RF Circuit | ~221 |
| IR Circuit | ~223 |
| Bluetooth Circuit | ~225 |

~220

210

270

Fingerprint Reader

Memory

260

280

230

Power Supply Circuit

Controller

User Input Interface

Microphone

290

251

LED

Gyro Sensor

241

250

240

253

Vibrator

Acceleration Sensor

243

255

Speaker

257

Display

[FIG. 4]
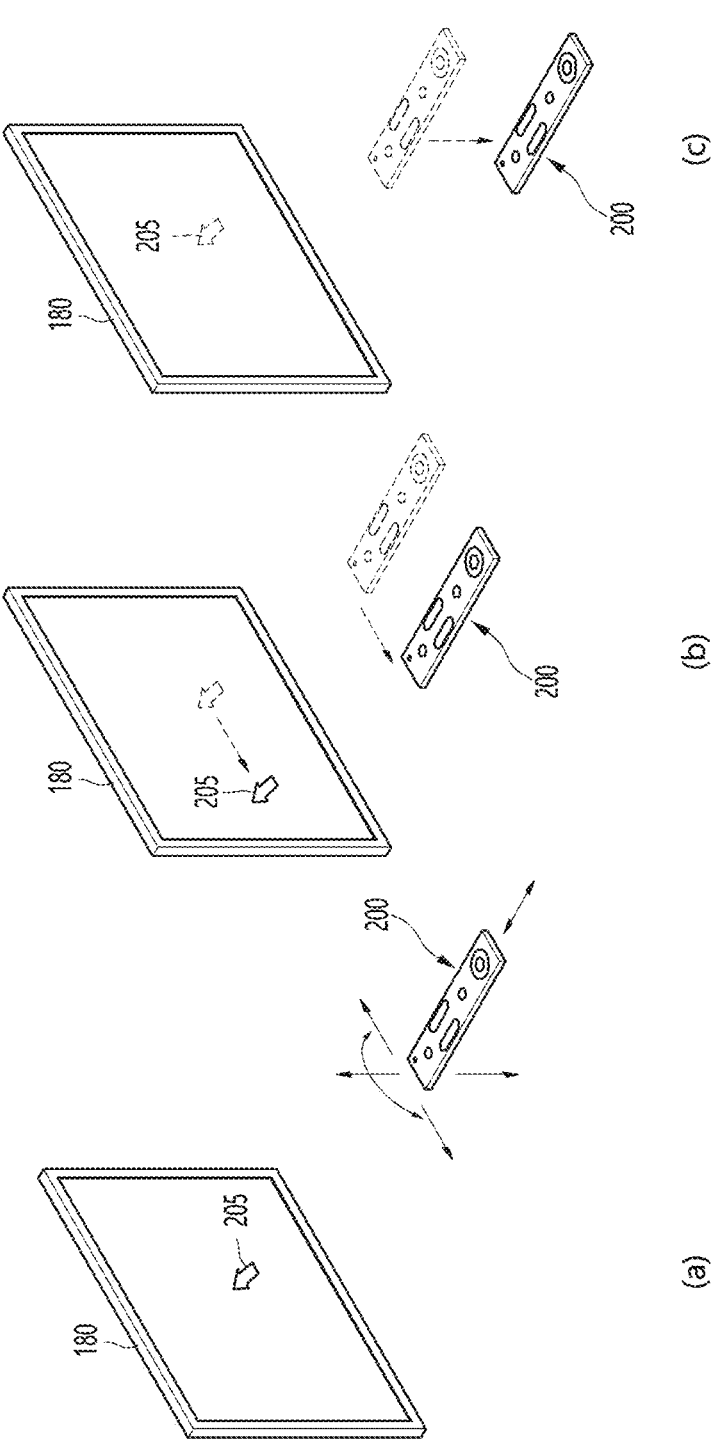

[FIG. 5]
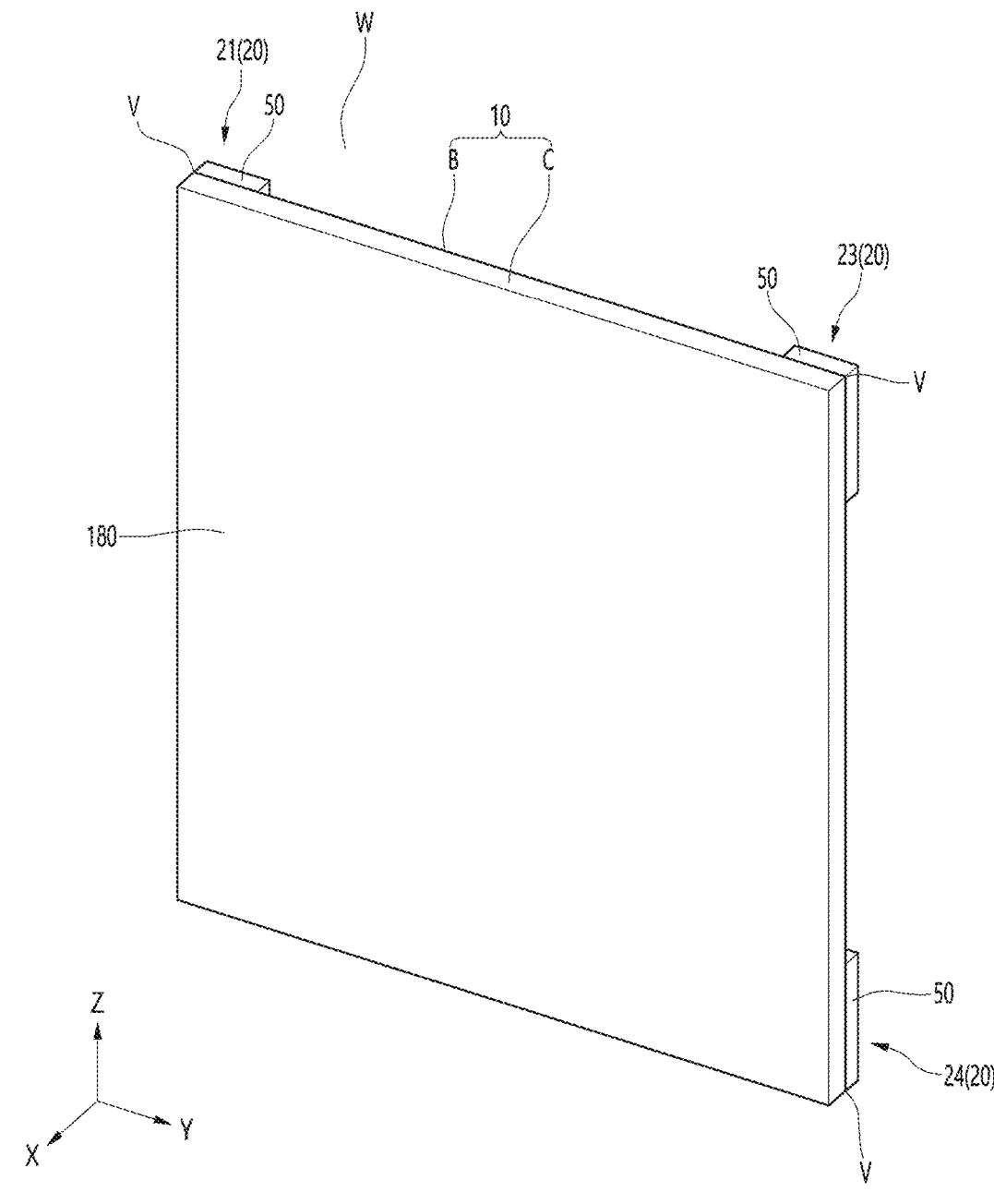

【FIG. 6】
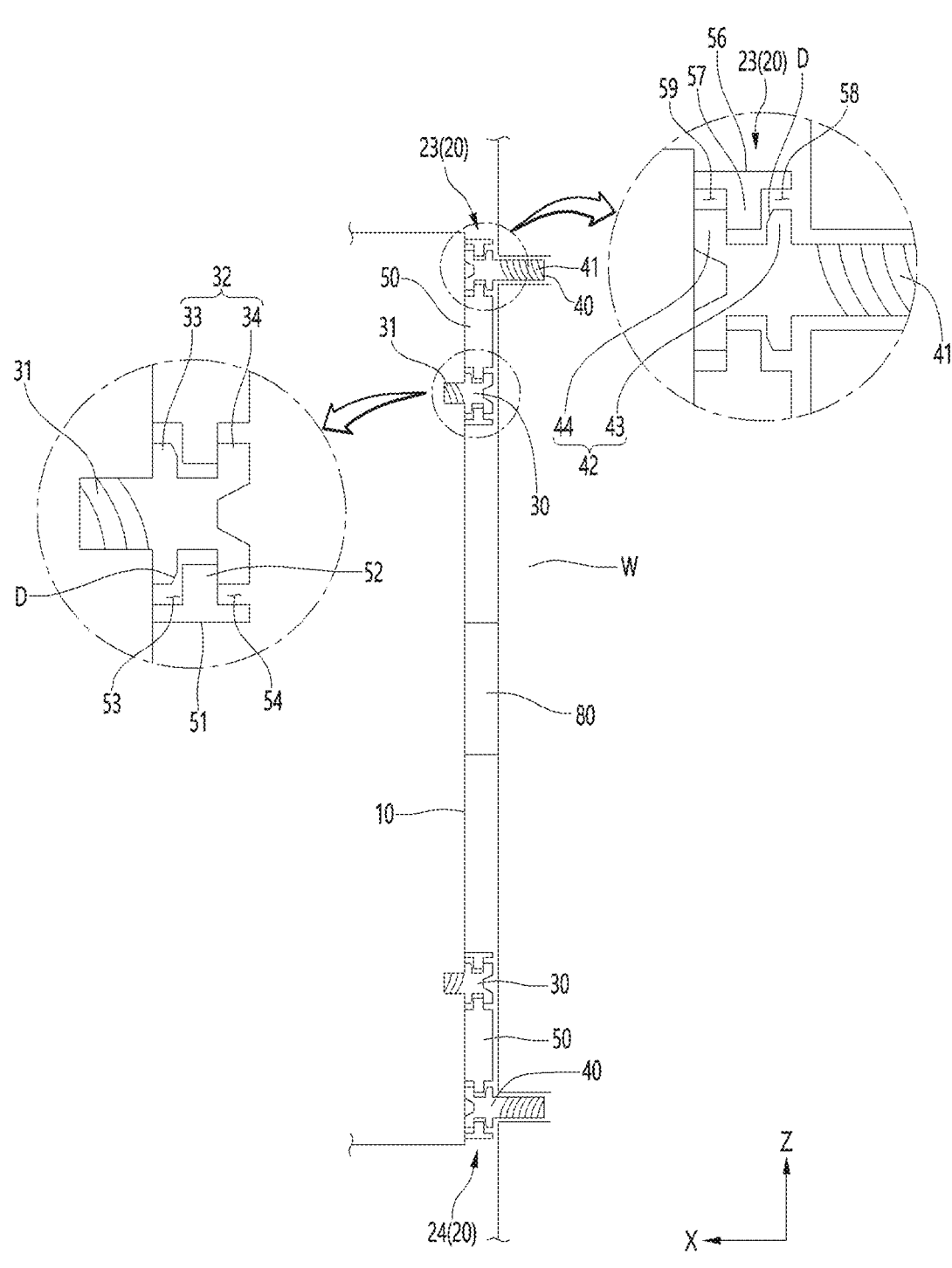

[FIG. 7]
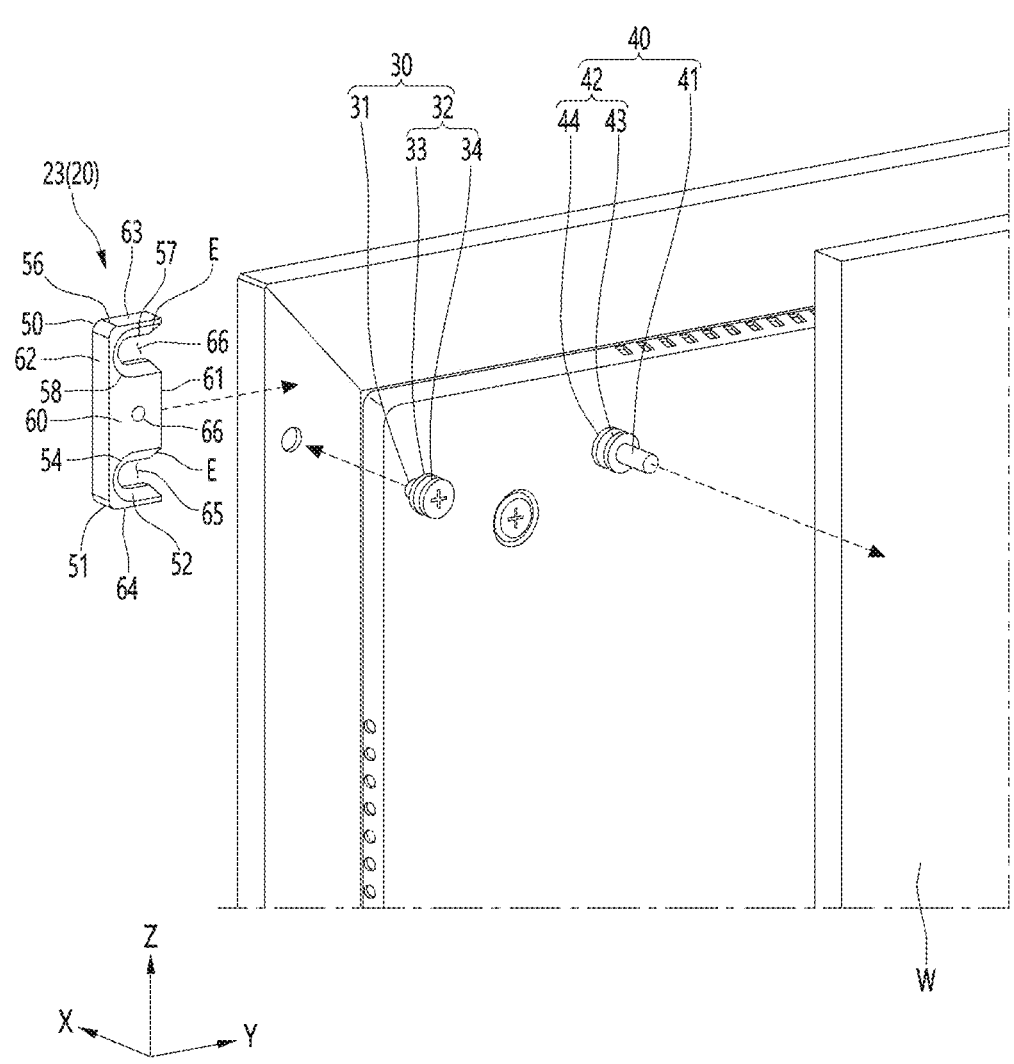

【FIG. 8】
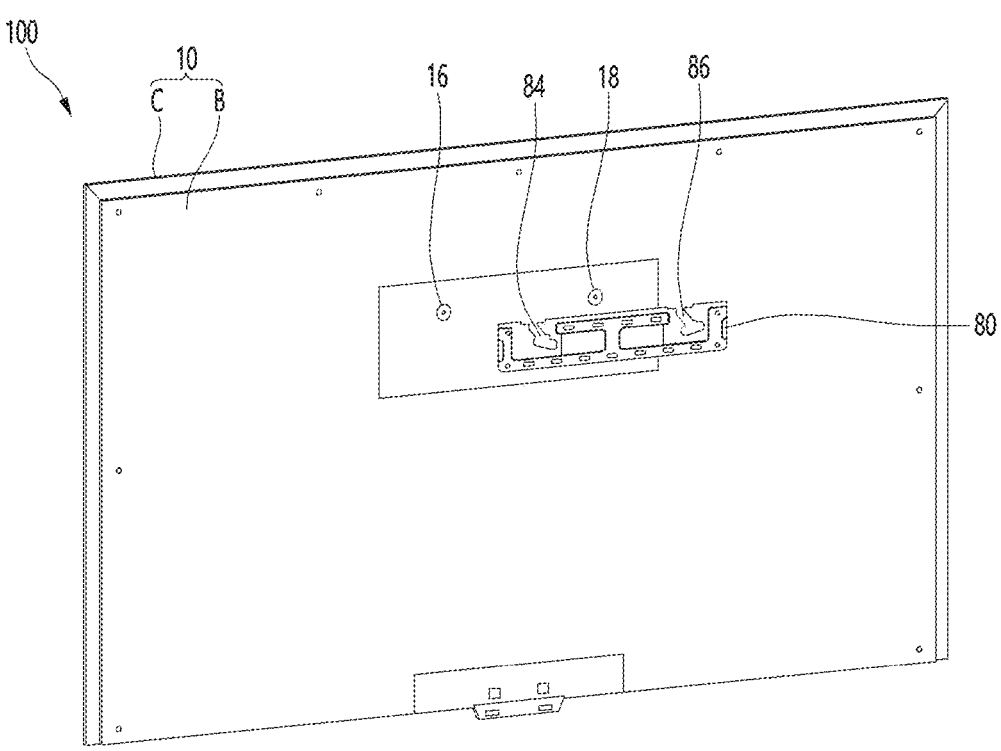
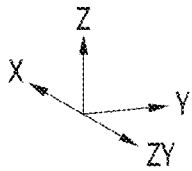

[FIG. 9]
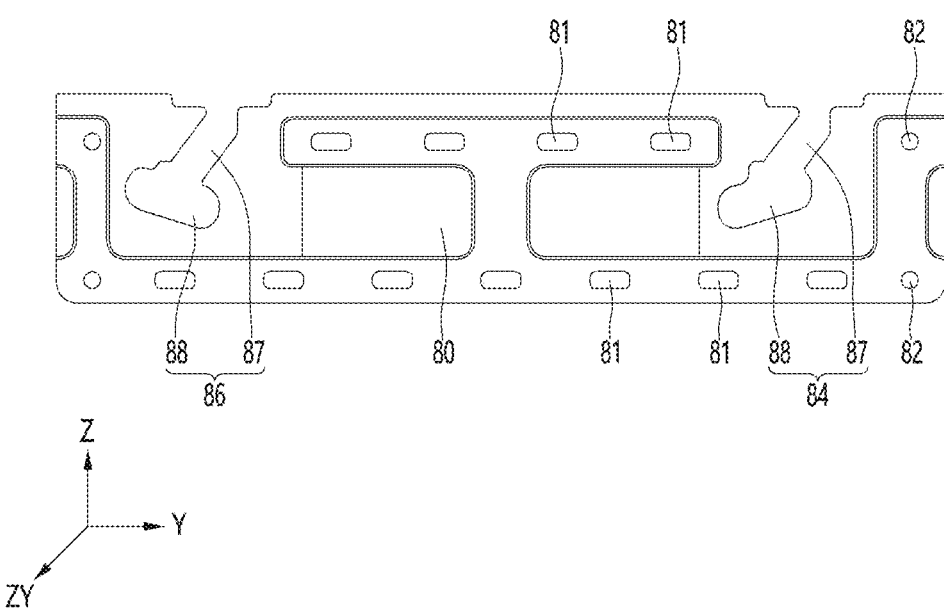

【FIG. 10】
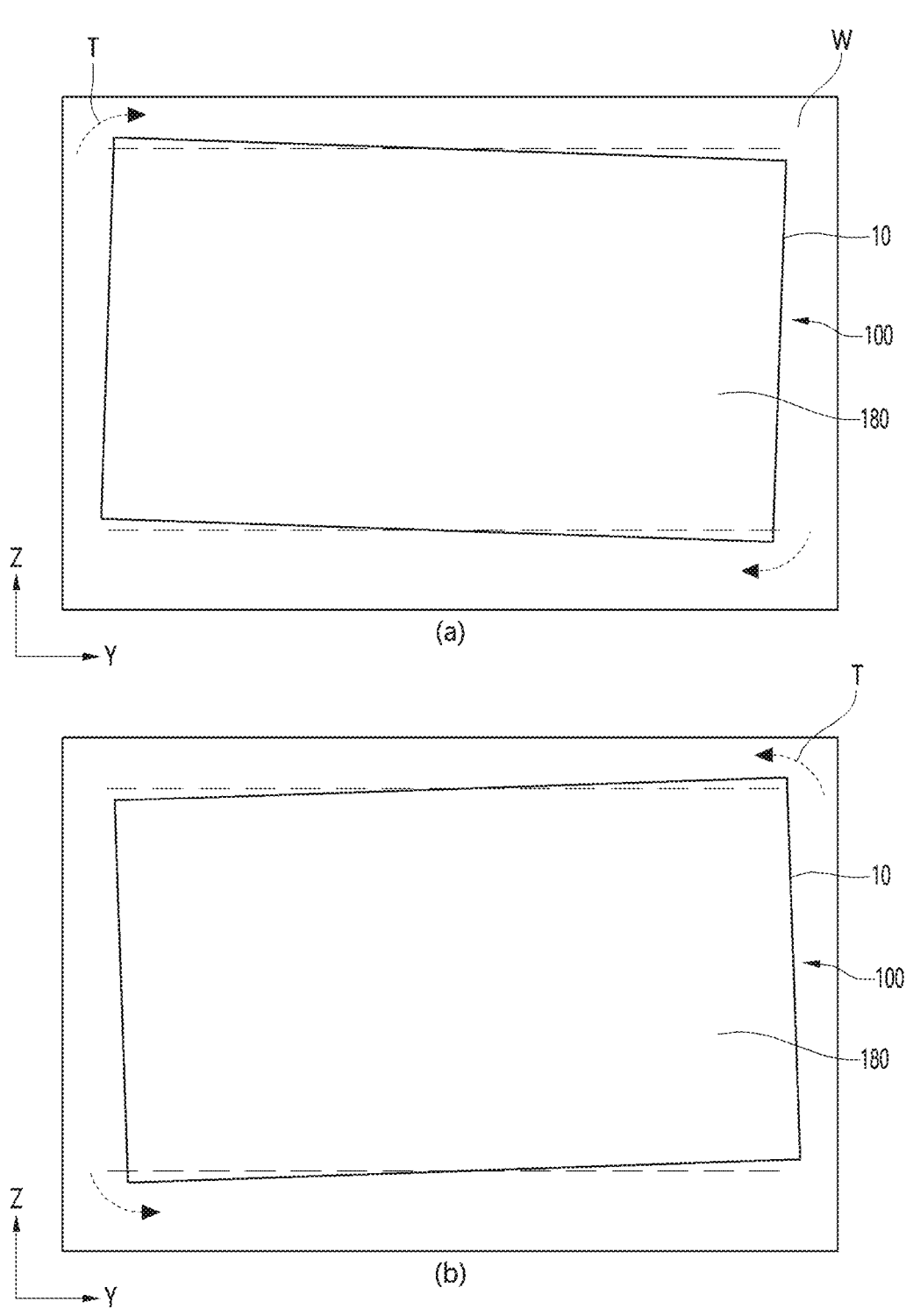
(a)
(b)

[FIG. 11]
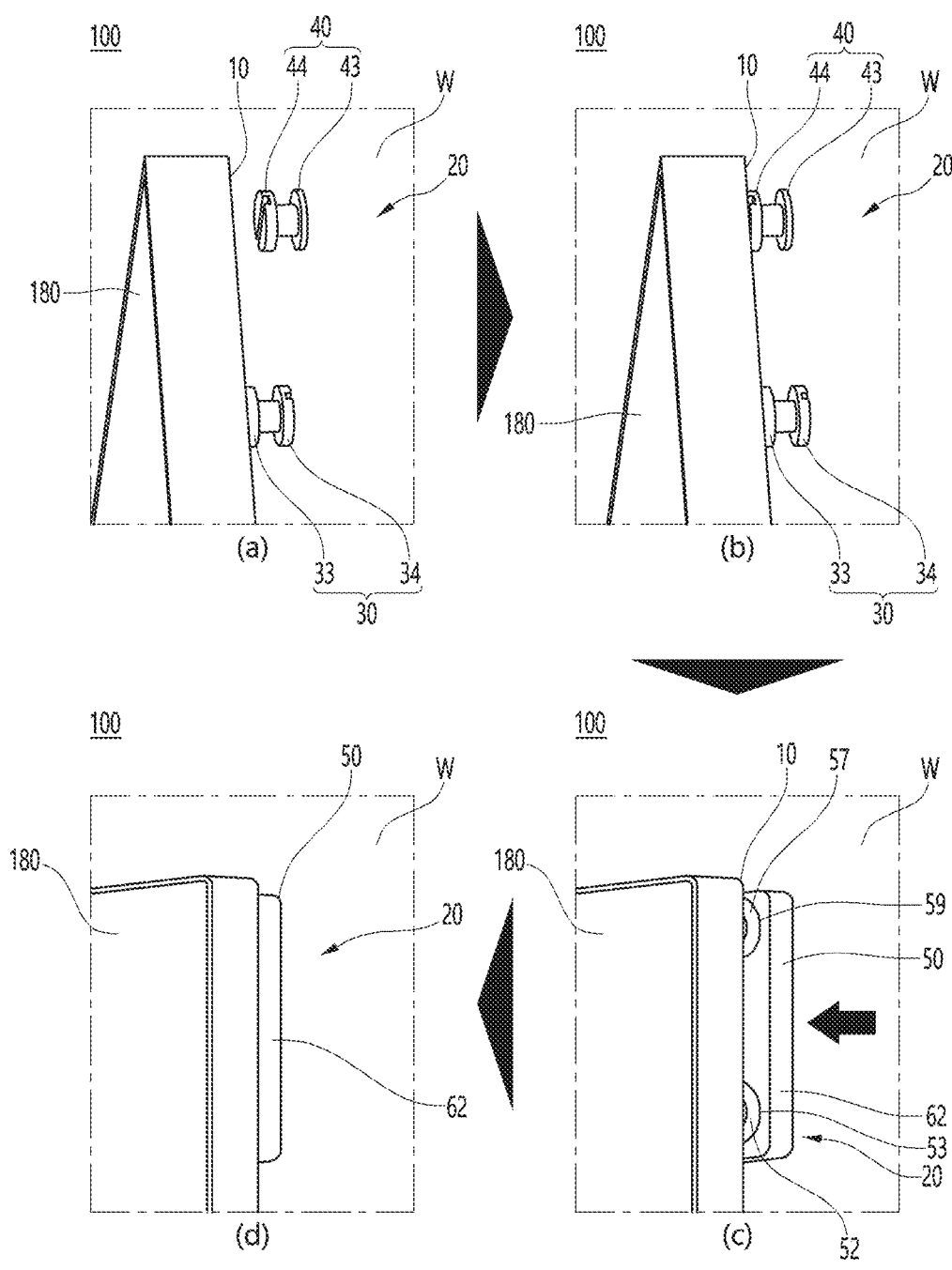

DISPLAY DEVICE

CROSS REFERENCE TO RELATED APPLICATIONS

This application is the National Phase of PCT/KR2022/003438 filed on Mar. 11, 2022, which claims priority under 35 U.S.C. § 119(a) to Patent Application No. 10-2022-0029822 filed in the Republic of Korea on Mar. 10, 2022, all of which are hereby expressly incorporated by reference into the present application.

TECHNICAL FIELD

The present disclosure relates to a display device.

BACKGROUND ART

A display device may include a display and a display body, such as a back cover that protects the display, and may be mounted on a wall using a wall mounter.

The display device mounted on the wall using the wall mounter may include a magnet provided on the back of the display body, and a fastening portion of the wall mounter may be fastened to the wall using a fastening member such as a screw.

An example of the display device using a magnet and a wall mounter is the display device disclosed in Korean Patent Publication No. 10-2016-0141478 A (published on Dec. 9, 2016), and the display device comprises a display panel that displays content; and a bottom chassis that faces a wall when the display device is mounted on the wall, and the bottom chassis is capable of contacting a wall mount plate fixed to the wall by magnetic force.

DISCLOSURE OF INVENTION

Technical Problem

An object of the present disclosure is to provide a display device capable of minimizing lifting of a display body.

Technical Solution

According to an embodiment, a display device comprises a display body, and at least one fastener configured to fix the display body to a wall.

The at least one fastener may include a first fastening member and a second fastening member.

The first fastening member may have a first threaded portion screw-fastened to the display body and comprises a pair of first protrusions protruding from the first fastening member.

The second fastening member may have a second threaded portion screw-fastened to the wall and comprises a pair of second protrusions protruding from the second fastening member.

The first fastening member and the second fastening member may be spaced apart in an up-down direction.

The at least one fastener may include a fixer, and the fixer may include a first connection portion having a first rib inserted between the pair of first protrusions and a second connection portion having a second rib inserted between the pair of second protrusions.

The first connection portion and the second connection portion may be spaced apart in the up-down direction.

One of the first pair of protrusions, which is closer to the first threaded portion, may have a tapered portion that narrows outwardly and one of the second pair of protrusions, which is closer to the second threaded portion each may have a tapered portion that narrows outwardly.

The first connection portion may include a first receiving recess into which one of the pair of first protrusions is inserted and received, and a second receiving recess into which the other of the pair of first protrusions is inserted and received, The second connection portion may include a third receiving recess into which one of the pair of second protrusions is inserted and received, and a fourth receiving recess into which the other of the pair of second protrusions is inserted and received.

The fixer may have an inner surface, and the inner surface may have a first insertion recess into which a portion of the first fastening member is inserted and a second insertion recess into which a portion of the second fastening member is inserted.

The fixer may have an outer surface having a flat surface.

The first and second ribs each may include an introductory portion that narrows towards an opposite side to the outer surface.

The fixer may include a central portion connecting the first connection portion and the second connection portion.

The size of the central portion may be larger than sizes of the first and second connection portions.

The central portion may include an insertion hole that passes through the central portion in a front-back direction, a tool for moving the fixer being inserted into the insertion hole.

The display device may further include a wall mounter mounted on the wall. The wall mounter may be supported on the wall.

The wall mounter may include a fastening hole through which a fastening member to be fastened to the wall passes, and a guide groove formed therein, a guide member provided in the display body being guided along the guide groove.

The display body may be tiltable at a set angle with respect to the wall mounter.

Advantageous Effects

According to the embodiments, the first fastening member fastened to the display, the second fastening member fastened to the wall may be connected to engage the fixer, thus minimizing the lifting of the display body, and firmly supporting the display body.

BRIEF DESCRIPTION OF DRAWINGS

FIG. 2 is a block diagram of a remote control device according to an embodiment.

FIG. 4 is a diagram showing an example of using a remote control device according to an embodiment.

FIG. 5 is a perspective view of a display device according to an embodiment when mounted on a wall.

FIG. 6 is a cross-sectional view of a display device according to an embodiment when mounted on a wall.

FIG. 7 is a exploded perspective view of a display device according to an embodiment.

FIG. 8 is a view showing a mounter mounted to a display according to an embodiment.

FIG. 9 is a front view of a mounter according to an embodiment.

FIG. 10 is a view showing a display body tilted relative to a mounter according to an embodiment.

FIG. 11 is a diagram illustrating a process of mounting a display on a wall according to an embodiment.

BEST MODE FOR CARRYING OUT THE INVENTION

Hereinafter, embodiments of the present disclosure will be described in detail with reference to the drawings. The suffixes "interface", "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be a network TV, Hybrid Broadcast Broadband TV (HBBTV), smart TV, light-emitting diode (LED) TV, organic light-emitting diode (OLED) TV, and the like and may be applied to a smart phone in some cases.

Figure 1:
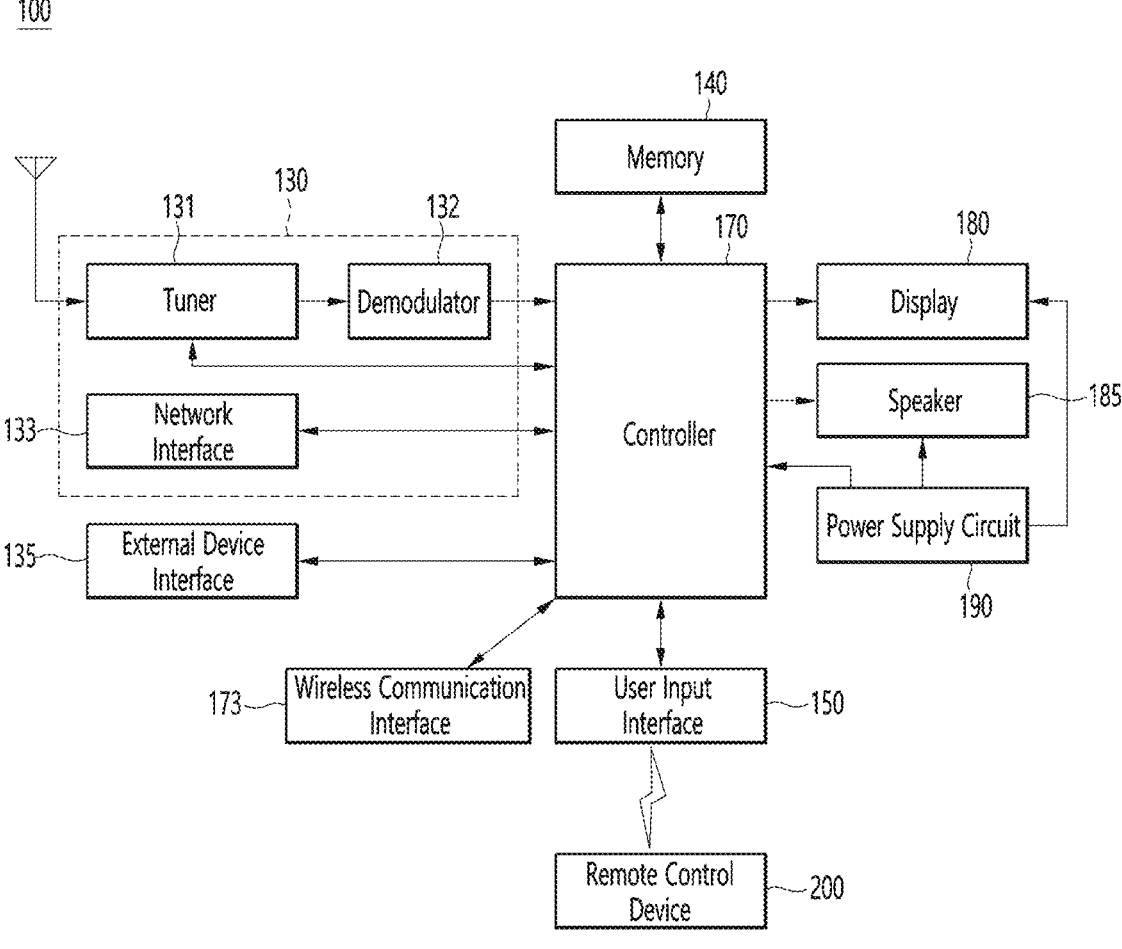
FIG. 1 is a block diagram showing a configuration of a display device according to an embodiment.

FIG. 1 is a block diagram showing a configuration of a display device according to an embodiment.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of an image and audio output from an external device connected to the display device 100 in a wired or wireless manner, and transmit the same to the controller 170. The external device interface 135 may include a plurality of external input terminals. The plurality of external input terminals may include an RGB terminal, at least one High Definition Multimedia Interface (HDMI) terminal, and a component terminal.

The video signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network comprising an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, the network interface unit 133 may transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto, which are provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store video, audio, or data signals, which have been subjected to signal-processed.

In addition, the memory 140 may perform a function for temporarily storing video, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication methods, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The video signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output a video signal or an audio signal through the display 180 or the speaker 185, according to a command for playing back a video of an external device through the user input interface 150, the video signal or the audio signal being input from an external device, for example, a camera or a camcorder, through the external device interface 135.

Meanwhile, the controller 170 may allow the display 180 to display an image, for example, allow a broadcast video which is input through the tuner 131 or an external input video which is input through the external device interface 135, a video which is input through the network interface unit or a video which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast video, an external input video, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Furthermore, the display device 100 shown in FIG. 1 is just one embodiment of the present invention some of the illustrated components may be integrated, added, or omitted depending on the specification of the display device that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device comprising the display 180 the audio output unit 185.

Next, a remote control device according to an embodiment of the present disclosure will be described with reference to FIGS. 2 to 3.

Figure 3:
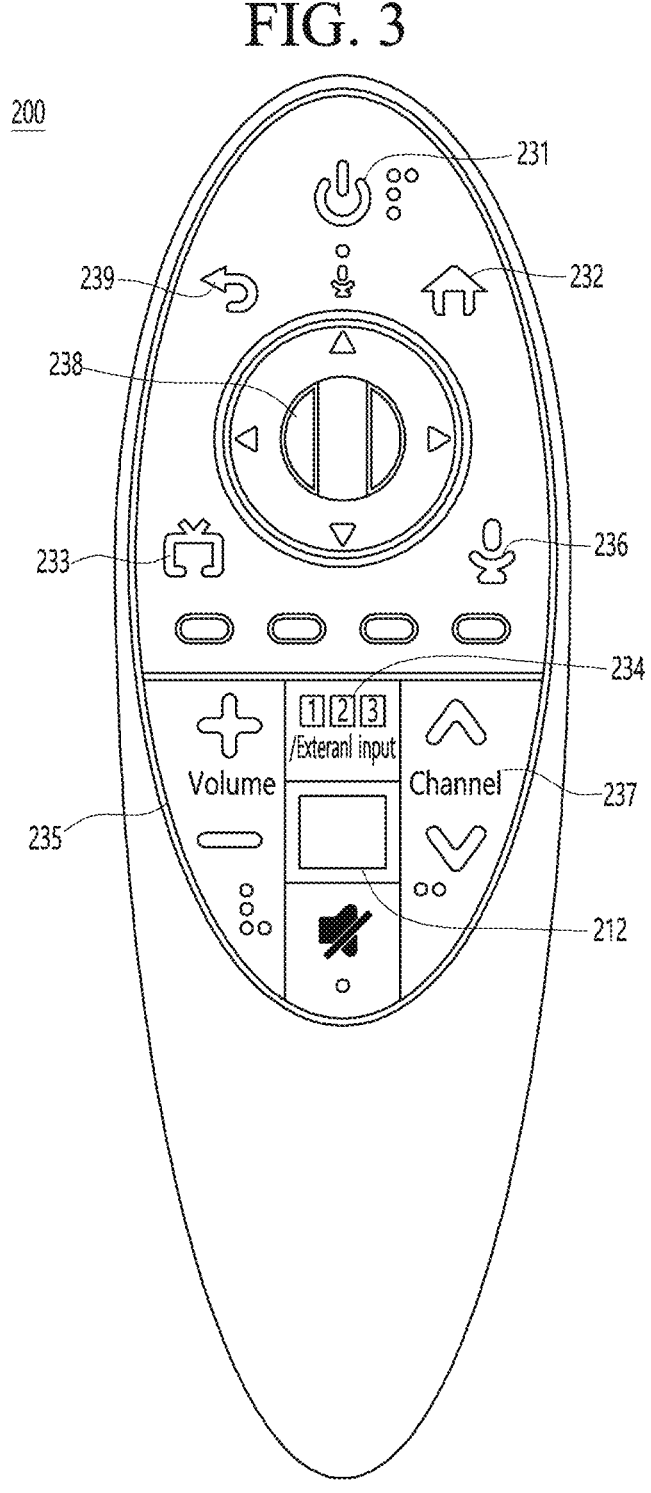
FIG. 3 is a diagram showing a configuration of a remote control device according to an embodiment.

FIG. 2 is a block diagram of a remote control device according to an embodiment, and FIG. 3 is a diagram showing a configuration of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 comprises a hard key button, the user may input a command related to the display device 100 to the remote control device 200 through a push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 comprises a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display apparatus 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Moreover, the moving speed or moving direction of the pointer 205 can correspond to the moving speed or moving direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept comprising a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

FIG. 5 is a perspective view of a display device according to an embodiment when mounted on a wall, FIG. 6 is a cross-sectional view of a display device according to an embodiment when mounted on a wall, and FIG. 7 is a exploded perspective view of a display device according to an embodiment.

The display device 100 may include a display body 10.

The display body 10 may include a back cover B (or bottom chassis), which forms the back exterior of the display device 100. The back cover B may have the shape of a plate.

The display body 10 may include an outer body C forming an outer perimeter face of the display device 100. The outer body C may have the shape of a square flame.

The display body 10 may have a three-dimensional shape having vertexes V.

The display body 10 may support the display 180.

The display device 100 may include at least a fastener 20.

The at least fastener 20 may fasten the display body 10 to a wall W. The fastener 20 may fasten a portion of the display body 10 proximate to the vertex V to the wall W.

A plurality of fasteners 20 may be provided. The plurality of fasteners 20 may be side-to-side symmetrical, and may be top-to-bottom symmetrical. The plurality of fasteners 20 may be of the same configuration.

The plurality of fasteners 20 may include a right upper fastener 21, a right lower fastener (not shown), a left upper fastener 23, and a left lower fastener 24, as shown in FIG. 5.

The right upper fastener 21 and the right lower fastener (not shown) may be spaced apart in an up-down direction (Z). The left upper fastener 23 and the left lower fastener 24 may be spaced apart in the up-down direction (Z).

The left upper fastener 23 and the right upper fastener 21 may be spaced apart in a left-right direction (Y), and the left lower fastener 24 and the right lower fastener (not shown) may be spaced apart in the left-right direction (Y).

The fastener 20 may include a first fastening member 30, a second fastening member 40, and a fixer 50, as shown in FIGS. 6 and 7. Each of the plurality of fasteners 20 may include the first fastening member 30, the second fastening member 40, and the fixer 50.

The first fastening member 30 may have a first threaded portion 31 that is screw-fastened to the display body 10. The first fastening member 30 may have a pair of first protrusions 33 (34) protruding from the first fastening member 30.

The overall shape of each of the pair of first protrusions 33 and 34 may be ring-shaped.

The first fastening member 30 may include a first head 32 formed integrally with the first threaded portion 31. The first head 32 may include a pair of first protrusions 33 and 34, and a gap may be formed between the pair of first protrusions 33 and 34 into which a first rib 52 of the fixer 50 is able to be inserted.

The protrusion 33 proximate to the first threaded portion 31 among the pair of first protrusions 33 and 34 may have a tapered portion D formed thereon. The tapered portion D may be formed to narrow outwards (radially outwards).

The tapered portion D may be formed in a surface facing the protrusion 34 that is further away from the first threaded portion 31 among the pair of first protrusions 33 and 34. The tapered portion D may assist in the initial insertion of the first rib 52.

The second fastening member 40 may have a second threaded portion 41 that is screw-fastened to the wall W. The second fastening member 40 may have a pair of second protrusions 43 and 44 protruding therefrom.

The second fastening member 40 may include a second head 32 formed integrally with the second threaded portion 41. The second head 42 may include the pair of second protrusions 43 and 44, and a gap may be formed between the pair of second protrusions 43 and 44 into which a second rib 57 of the fixer 50 is able to be inserted.

The protrusion 43 proximate to the second threaded portion 41 among the pair of second protrusions 43 and 44 may have a tapered portion D formed thereon. The tapered portion D may be formed to narrow outwards (radially outwards). The tapered portion D may be formed in a surface facing the protrusion 44 that is further away from the second threaded portion 41 among the pair of second protrusions 43 and 44. The tapered portion D may assist in the initial insertion of the second rib 57.

When the first fastening member 30 is fastened to the display body 10 and the second fastening member 40 is fastened to the wall W, the first fastening member 30 and second fastening member 40 may be spaced apart in the up-down direction (Z).

The fixer 50 may be formed with a first connection portion 51 and a second connection portion 56.

The first connection portion 51 may include a first rib 52 inserted between the pair of first protrusions 33 and 34. The first rib 52 may be formed in an approximately 'D' shape when the fixer 50 is viewed from the front.

The first rib 52 may include an introductory portion E that narrows towards the opposite side of the outer surface 62. The introductory portion E may allow the first rib 52 to be easily inserted between the first protrusions 33 and 34.

The first connection portion 51 may include a first receiving recess 53 and a second receiving recess 54.

The first receiving recess 53 may receive any one of the pair of first protrusions 33 and 34 inserted therein. The first receiving recess 53 may be formed as a recess in the front of the first connection portion 51.

The second receiving recess 54 may receive the other of the pair of first protrusions 33 and 34 inserted therein. The second receiving recess 54 may be formed as a recess at the rear of the first connection portion 51.

The second connection portion 56 may include a second rib 57 inserted between the pair of second protrusions 43 and 44. The second rib 57 may be formed in an approximate ' ⊃ ' shape when the fixer 50 is viewed from the front.

The second rib 57 may include an introductory portion E that narrows towards the opposite side of the outer surface 62. The introductory portion E may allow the second rib 57 to be easily inserted between the second protrusions 43 and 44.

The second connection portion 56 may include a third receiving recess 58 and a fourth receiving recess 59.

The third receiving recess 58 may receive any one of the pair of second: protrusions 43 and 44 inserted therein. The third receiving recess 58 may be formed as a recess in the rear of the second connection portion 56.

The fourth receiving recess 59 may receive the other of the pair of second protrusions 43 and 44 inserted therein. The fourth receiving recess 59 may be formed as a recess in the front of the second connection portion 56.

The second connection portion 56 may include a second rib 57, a third receiving recess 58, and a region in which the fourth receiving recess 59 is formed.

The first connection portion 51 and the second connection portion 56 may be spaced apart in the up-down direction (Z).

The fixer 50 may include a central portion 60 connecting the first connection portion 51 and the second connection portion 56. The central portion 60 may be defined as a portion located between the first connection portion 51 and the second connection portion 56.

The fixer 50 may be formed in a roughly rectangular shape, and the length in the up-down direction (Z) (length of the fixer) may be greater than the length in the left-right direction (Y) (width of the fixer) and the length in the front-back direction (X) (thickness of the fixer).

The first connection portion 51, the central portion 60 and the second connection portion 56 may be positioned in line in the up-down direction (Z). The size of the central portion 60 may be larger than the size of each of the first connection portion 51 and the second connection portion 56.

The fixer 50 may include an inner surface 61, an outer surface 62, a top surface 63, and a bottom surface 64, as shown in FIG. 7.

The inner surface 61 may face the space between the display body 10 and the wall W when the fixer 50 is installed.

The inner surface 61 may have a first insertion recess 65 formed into which a portion of the first fastening member 30 is inserted and a second insertion recess 66 formed into which a portion of the second fastening member 40 is inserted.

The outer surface 62 may face the outside between the display body 10 and the wall W when the fixer 50 is installed.

The outer surface 62 may have a fat surface.

The top surface 63 may face upwardly when the fixer 50 is installed.

The bottom surface 64 may face downwardly when the fixer 50 is installed.

When the fixer 50 is installed, each of the outer surface 62, the top surface 63, and the bottom surface 64 may be visible from the outside of the display device 100, and each of the outer surface 62, the top surface 63, and the bottom surface 64 may be formed in a flat surface.

The fixer 50 may be formed of an aluminium (Al) material, and may be manufactured by aluminium die casting.

The fixer 50 may be manufactured by an aluminium die casting process in which molten aluminium is forced into a die having a higher melting point than aluminium, and after the fixer 50 is manufactured, the fixer 50 may be withdrawn (moved) from the die by a tool such as a wire.

In the central portion 60, an insertion hole 66 (see FIG. 7) may be formed into which a tool for moving the fixer 60 is inserted. The insertion hole 66 may pass through the central portion 60 in the front-back direction (X).

The display device 100 may further comprise a wall mounter 80 mounted on a wall W, as shown in FIG. 6, and the display body 10 may be supported on the wall mounter 80.

FIG. 8 is a view showing a mounter mounted to a display according to an embodiment, FIG. 9 is a front view of a mounter according to an embodiment, and FIG. 10 is a view showing a display body tilted relative to a mounter according to an embodiment.

The wall mounter 80 may have fastening holes 81 and 82 and guide grooves 84 and 86 formed therein.

The wall mounter 80 may be fixed to the wall W by a fastening member (not shown) such as a screw.

The will mounter 80 may not only support the load of the display 180, the display body 10 and the like, but also assist in assembling the display device 100 using the fastener 20.

The fastening holes 81 and 82 may be penetrated by a fastening member (not shown) such as a screw that is fastened to the wall W.

The fastening holes 81 and 82 may include through-holes 81 through which a fastening member, such as screws, that are fastened to the wall W may pass. A plurality of through holes 81 may be formed in the wall mounter 80. The through-holes 81 may be elongate holes formed in the left-right direction (Y).

The fastening holes 81 may include a guide hole 82 through which a guide member, such as a screw that is fastened to the wall W, may pass. A plurality of guide holes 82 may be formed in the wall mounter 80.

The wall mounter 80 may be fastened to the wall W, and may support the display body 10 while being fixed to the wall W. The wall mounter 80 may not overlap the plurality of fasteners 20 in the front-back direction X. The wall mounter 80 may be smaller in size than the area formed by lines connecting the plurality of fasteners 20, and may be positioned within the area formed by the lines connecting the plurality of fasteners 20.

Guide members 16 and 18, such as a screw, may be fastened to he display body 10 and the guide members 16 and 18 may be guided along the guide grooves 84 and 86 in an approximately downwardly inclined direction ZY while being fastened to the display body 10, and seated in the guide grooves 84 and 86.

A plurality of guide members 16 and 18 may be provided on the display body 10, and the plurality of guide members 16 and 18 may include a left guide member 16 and a right guide member 18 fastened to be spaced apart in the left-right direction.

The guide grooves 84 and 86 may guide the guide members 16 and 18 provided on the display body 10 in a tiltable manner.

The guide grooves 84 and 86 may include an upper guide groove 87 formed elongated in an inclined direction from the top of the wall mounter 80 to the lower right portion of the wall mounter 80, and a lower guide groove 88 configured to communicate with the upper guide groove 87 and elongated in an inclined direction to the lower left portion of the wall mounter 80 or the inclined direction to the lower right portion.

The upper guide groove 87 may be formed to pass through the wall mounter 80 in the front-back direction (Z), and the upper end of the upper guide groove 87 may be open in the up-down direction (Z).

The lower guide groove 88 may be formed to pass through the wall mounter 80 in the front-back direction (Z), and an end of the upper portion of the lower guide groove 88 may communicate with the upper guide groove 87 in the up-down direction (Z).

The length of the upper guide groove 87 may be longer than the length of the lower guide groove 88.

A plurality of guide grooves 84 and 86 may be formed in the wall mounter 80, and the plurality of guide grooves 84 and 86 may include a left guide groove 84 and a right guide groove 86 spaced apart in the left-right direction.

Each of the left guide groove 84 and the right guide groove 86 may include an upper guide groove 87 and a lower guide groove 88, and the inclination direction of the lower guide groove 88 of the left guide groove 84 may be different from the inclination direction of the lower guide groove 88 of the right guide groove 86.

For example, the lower guide groove 88 of the left guide groove 84 may elongate in the inclined direction of the lower right portion, and the lower guide groove 88 of the right guide groove 86 may elongate n the inclined direction of the lower left portion.

The left guide member 16 may be guided in the left guide groove 84, and the right guide member 18 may be guided in the right guide groove 86.

As shown in FIG. 10, the display body 10 may be capable of be tilted (T) at a set angle with respect to the wall mounter 80.

In FIG. 10, (a) is a diagram showing the display body 10 tilted at a set angle clockwise with respect to the wall mounter 90 shown in FIG. 9, and (b) is a diagram showing the display body 10 tilted (T) at a set angle counterclockwise with respect to the wall mounter 90.

The set angle may be one of 1° to 5°, for example, 2°. In this case, an operator may fasten the second fastening members 40 of some fasteners to the wall W while tilting the display body 10 at an angle of 2° clockwise, as shown in (a) of FIG. 10 and fasten the second fastening members 40 of some fasteners to the wall W while tilting the display body 10 at an angle of 2° counterclockwise, as shown in (a) of FIG. 10.

The operator may fasten the second fastening members 40 of the upper left fastener 21 and the second fastening members 40 of the upper right fastener 24 to the wall W while tilting the display body 10 at an angle of 2° clockwise.

The operator tilts the display body 10 by 2° counterclockwise and connects the second fastening member 40 of the lower right fastening mechanism (not shown) and the second fastening member 40 of the upper left fastening mechanism 23 can be fastened to the wall W.

FIG. 11 is a diagram illustrating a process of mounting a display on a wall according to an embodiment.

In FIG. 11, (a) is a diagram showing a case where the first fastening member 30 is fastened to the display body 10, the mounter 80 is fastened to the wall W, and the display body 10 is fastened to the wall W while tilting (T) the display body 10 clockwise and counterclockwise at the set angle.

As shown in (b) of FIG. 11, the operator may bring the tip of the second fastening member 40 as close to the display body 10 as possible, and the display body 10 may be as close as possible to the wall W. In this case, the back of the display body 10 may not be in contact with the wall W and may be spaced apart from the wall W. Further, a gap into which the fixer 50 may be inserted may be formed between the display body 10 and the wall W.

As shown in (c) of FIG. 11, the operator may insert the fixer 50 into the gap between the display body 10 and the wall W, and the fixer 50 may be pushed in such that the first rib 52 is inserted between the pair of protrusions 33 and 34, and the second rib 57 is inserted between the pair of second protrusions 43 and 44. When the fixer 50 is inserted as shown in (c) of FIG. 11, the fixer 50 may be engaged with the first fastening member 30 and the second fastening member 40, individually.

While the fixer 50 is being inserted, the first rib 52 may be caught on the first fastening member 30, and the second rib 57 may be caught on the second fastening member 40. The fixer 50 may no longer be inserted, and as shown in (d) of FIG. 11, the fastening of the display body 10 by the fastener 20 is completed.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

The invention claimed is:

1. A display device comprising:
a display body; and
at least one fastener configured to fix the display body to a wall,
wherein the at least one fastener comprises
a first fastening member having a first threaded portion screw-fastened to the display body and comprising a pair of first protrusions protruding from the first fastening member;
a second fastening member having a second threaded portion screw-fastened to the wall and comprising a pair of second protrusions protruding from the second fastening member; and
a fixer comprising a first connection portion having a first rib inserted between the pair of first protrusions and a second connection portion having a second rib inserted between the pair of second protrusions.

2. The display device of claim 1, wherein the first fastening member and the second fastening member are spaced apart in an up-down direction, and
wherein the first connection portion and the second connection portion are spaced apart in the up-down direction.

3. The display device of claim 1, wherein one of the first pair of protrusions, which is closer to the first threaded portion, has a tapered portion that narrows outwardly and one of the second pair of protrusions, which is closer to the second threaded portion each has a tapered portion that narrows outwardly.

4. The display device of claim 1, wherein the first connection portion comprises:

a first receiving recess into which one of the pair of first protrusions is inserted and received; and
a second receiving recess into which the other of the pair of first protrusions is inserted and received,
wherein the second connection portion comprises:
a third receiving recess into which one of the pair of second protrusions is inserted and received; and
a fourth receiving recess into which the other of the pair of second protrusions is inserted and received.

5. The display device of claim 1, wherein the fixer has:
an inner surface having a first insertion recess into which a portion of the first fastening member is inserted and a second insertion recess into which a portion of the second fastening member is inserted; and
an outer surface having a flat surface.

6. The display device of claim 5, wherein the first and second ribs each comprises an introductory portion that narrows towards an opposite side to the outer surface.

7. The display device of claim 1, wherein the fixer comprises a central portion connecting the first connection portion and the second connection portion, and
wherein a size of the central portion is larger than sizes of the first and second connection portions.

8. The display device of claim 7, wherein the central portion comprises an insertion hole that passes through the central portion in a front-back direction, a tool for moving the fixer being inserted into the insertion hole.

9. The display device of claim 1, further comprising:
a wall mounter on which the display body is supported and which is mounted on the wall.

10. The display device of claim 9, wherein the wall mounter comprises:
a fastening hole through which a fastening member to be fastened to the wall passes; and
a guide groove formed therein, a guide member provided in the display body being guided along the guide groove,
wherein the display body is tiltable at a set angle with respect to the wall mounter.

* * * * *